United States Patent
Watanabe

(10) Patent No.: US 6,315,409 B1
(45) Date of Patent: Nov. 13, 2001

(54) FIXTURES AND FITTING STRUCTURE FOR EYEGLASS LENS

(75) Inventor: Tsuyoshi Watanabe, Sabae (JP)

(73) Assignee: Fur Seal Company Limited, Sabae (JP)

( * ) Notice: Subject to any disclaimer, the term of this patent is extended or adjusted under 35 U.S.C. 154(b) by 0 days.

(21) Appl. No.: 09/745,930

(22) Filed: Dec. 26, 2000

(30) Foreign Application Priority Data

Aug. 11, 2000 (JP) .................................................. 12-244336

(51) Int. Cl.[7] ....................................................... G02C 5/00
(52) U.S. Cl. ............................ 351/141; 351/110; 351/146
(58) Field of Search ................................... 351/110, 140, 351/141, 145, 146; 411/178

(56) References Cited

U.S. PATENT DOCUMENTS

| | | | |
|---|---|---|---|
| 2,036,551 | * | 4/1936 | Stevens .................................. 351/140 |
| 4,439,078 | * | 3/1984 | Dessouroux .......................... 411/178 |
| 5,659,380 | * | 8/1997 | Kbayashi .............................. 351/141 |
| 6,024,523 | * | 2/2000 | Oudmayer ............................. 411/178 |

* cited by examiner

*Primary Examiner*—Huy Mai
(74) *Attorney, Agent, or Firm*—Bacon & Thomas, PLLC

(57) ABSTRACT

Fixtures and a fitting structure for eyeglass lens are provided wherein the eyeglass lens is easily fitted while preventing cracks in the eyeglass lens during the fitting and preventing loosening of the eyeglass lens during being used. Tapped holes are formed at the respective locations in the inside and outside rims of the eyeglass lens so as to be fitted by pipe screws having threads on at least the internal peripheral faces thereof. A fitting portion of a bridge or a fitting portion of an end piece is located over the top surface of the eyeglass lens so that a hole at the end of the fitting portion is aligned with the tapped hole of the eyeglass lens. Setscrews are inserted into the holes of the fitting portions from the topside of the eyeglass lens so as to be screwed and tightened with the threads in the internal side of the pipe screws. When the setscrew is tightened, the pipe screw is expanded so as to increase the diameter thereof, so that the thread on the external peripheral surface of the pipe screw is tightly pressed onto the internal surface of the tapped hole in the eyeglass lens.

6 Claims, 3 Drawing Sheets

FIXTURES AND FITTING STRUCTURE FOR EYEGLASS LENS

BACKGROUND OF THE INVENTION

1. Field of the Invention

The present invention relates to fixtures and a fitting structure for an eyeglass lens, and in particular relates to fixtures and a fitting structure for an eyeglass lens suitable for fitting the eyeglass lens between a bridge and an end piece of a two-point type eyeglass frame.

2. Description of the Related Art

There are various kinds of the two-point type eyeglass frames; for example, the generally known is that comprises an I-shaped bridge, a nose pad to be attached to the bridge, an L-shaped end piece, and a temple swingablly attached to the end piece via a hinge, etc.

In order to attach an eyeglass lens between the bridge and the end piece of an eyeglass frame of such a structure: first, through-holes are formed at the inside and outside rims of the eyeglass lens by using a tool such as a drill; two of the eyeglass lenses are prepared and arranged to have a predetermined spacing therebetween; the bridge is arranged between the both eyeglass lenses; fitting portions at both ends of the bridge are located over top faces of the eyeglass lenses; a hole in each of the fitting portions is aligned with the through-hole of the inside rim of the eyeglass lens; a setscrew is inserted through both the holes via a washer from the top side of the eyeglass lens; a nut is screwed to a portion of the setscrew protruded from the back side of the eyeglass lens via a washer so as to be tightened at a predetermined torque; a locking cap nut is screwed to the end portion of the setscrew so as to be tightened at a predetermined torque.

Then, the end piece is located at the outside rim of each eyeglass lens; a fitting portion at one end of the end piece is located over the top face of the eyeglass lens; a hole in the fitting portion is aligned with the through-hole in the outside rim of the eyeglass lens; a setscrew is inserted through both the holes via a washer from the top side of the eyeglass lens; a nut is screwed to a portion of the setscrew protruded from the backside of the eyeglass lens via a washer so as to be tightened at a predetermined torque; a locking cap nut is screwed to the end portion of the setscrew so as to be tightened at a predetermined torque.

In such a manner, the two eyeglass lenses are respectively attached between the bridge and the end piece of the two-point type eyeglass frame.

However, when the nut is screwed and tightened to the setscrew, the eyeglass lens may be occasionally cracked from the hole portion due to an excessive stress in the thickness direction of the eyeglass lens, so that special attention is required for the assembling and a skilled technique is also demanded in the assembling.

Moreover, since th e setscrews, the washers, the nuts, and the cap screws are used, the costs of parts and assembling rise due to a large number of parts.

Further, when the nut is screwed and tightened to the setscrew, since a special tool is required, inexperienced workers may occasionally damage the eyeglass lens.

Also, on the backside of the eyeglass lens located are the nut and the cap screw, which obstruct the visibility and wiping of the eyeglass lens.

SUMMARY OF THE INVENTION

The present invention has been made to solve the above-mentioned problems of the conventional structure, and it is an object of the present invention to provide fixtures and a fitting structure for an eyeglass lens, wherein when attaching the eyeglass lens between a bridge and an end piece of an eyeglass frame, the eyeglass lens cannot be cracked from a hole portion due to an excessive stress; the number of parts can be kept small, resulting in suppressing the costs of parts and assembling; the eyeglass lens can be easily assembled without a special tool and cannot be damaged even by an inexperienced worker; and further the visibility and wiping of the eyeglass lens are not obstructed.

In order to solve the above-mentioned problems, in accordance with one aspect of the present invention, fixtures for fitting an eyeglass lens between a bridge and an end piece of an eyeglass frame, the fixtures comprise: a pipe screw inserted into a tapped hole formed in at least one of locations of the inside and outside rims of the eyeglass lens and having a thread at least on the internal peripheral face of internal and external faces thereof; and a setscrew for expanding the diameter of the pipe screw by inserting the setscrew into a hole of each of fitting portions of the bridge and the end piece and by screwing and tightening the setscrew into the internal peripheral side of each pipe screw in an aligned state of at least one of combinations of the pipe screw in the inside rim with the hole in the fitting portion of the bridge and the pipe screw in the outside rim with the hole in the fitting portion of the end piece.

Preferably, the pipe screw comprises a flange formed at one end of the pipe screw, so that the flange is abutted on the surface of the eyeglass lens when the pipe screw is screwed into the tapped hole of the eyeglass lens.

At least one slit may be formed at the other end of the pipe screw, the slit penetrating between the external and internal peripheral faces of the pipe screw so as to expand the pipe screw so that the diameter of the pipe screw is increased due to the slit when the setscrew is screwed into the internal peripheral side of the pipe screw.

In accordance with another aspect of the present invention, there is provided a structure for fitting an eyeglass lens between a bridge and an end piece of an eyeglass frame prepared by a process comprising the steps of: forming a tapped hole in at least one of locations of the inside and outside rims of the eyeglass lens; inserting a pipe screw into the tapped hole, the pipe screw having a thread on at least the internal peripheral face of internal and external faces thereof; aligning at least one of combinations of the pipe screw in the inside rim with a hole in a fitting portion of the bridge, and the pipe screw in the outside rim with a hole in a fitting portion of the end piece; inserting a setscrew into the hole of each fitting portion; and screwing and tightening each setscrew into the internal peripheral side of each pipe screw so as to expand each pipe screw so that the diameter of the pipe screw is increased.

Preferably, the process further comprises the steps of: forming a flange at one end of the pipe screw; abutting the flange on the surface of the eyeglass lens when the pipe screw is screwed into the tapped hole of the eyeglass lens; and further forming at least one slit at the other end of the pipe screw, the slit penetrating between the external and internal peripheral faces of the pipe screw so as to expand the pipe screw so that the diameter of the pipe screw is increased due to the slit when the setscrew is screwed into the internal peripheral side of the pipe screw.

According to the present invention wherein the above-described fixtures and the structure are employed, pipe screws are respectively screwed into tapped holes formed at the respective locations in the inside and outside rims of the eyeglass lens; the pipe screw at the inside rim is aligned with the hole in the fitting portion of the bridge; the pipe screw at the outside rim is aligned with the hole in the fitting portion of the end piece; setscrews are respectively inserted into the hole of each fitting portion so as to be screwed and tightened with the pipe screws; the pipe screw is thereby expanded so as to increase tile diameter thereof, so that the external peripheral surface of the pipe screw is tightly pressed onto the internal surface of the tapped hole in the eyeglass lens.

According to the fixtures and the structure of the present invention formed as above, the eyeglass lens is attached between the bridge and the end piece by combined functions of the pipe screw with the setscrew. Therefore, the number of parts can be kept small, resulting in suppressing the costs of parts and assembling. When the setscrew is screwed and tightened to the pipe screw, the pipe screw is outwardly expanded so as to increase the diameter, so that the external peripheral surface of the pipe screw is tightly pressed on the internal surface of the tapped hole of the eyeglass lens. Thereby, the loosening of the pipe screw, the setscrew, and further the eyeglass lens during being used can be prevented. Further, when the setscrew is tightened to the pipe screw, the load is mainly applied in a direction expanding the tapped hole of the eyeglass lens and the load in the thickness direction of the eyeglass lens is small, so that the eyeglass lens cannot be cracked from the tapped hole, and thereby even inexperienced workers can assemble the eyeglass lens without worrying. Moreover, when the pipe screw and the setscrew are tightened, the eyeglass lens can be easily assembled with a general tool such as a screwdriver without a special tool and cannot be damaged even by an inexperienced worker. Further, as the nut and the cap nut are not used in the backside of the eyeglass lens, the field of vision is not thereby prevented and there are no obstacles when wiping the surface. Also, by forming the flange in the pipe screw, the flange serves as well as a washer and the washer is not required, so that the number of parts can be reduced.

DESCRIPTION OF THE PREFERRED EMBODIMENTS

Figure 1:
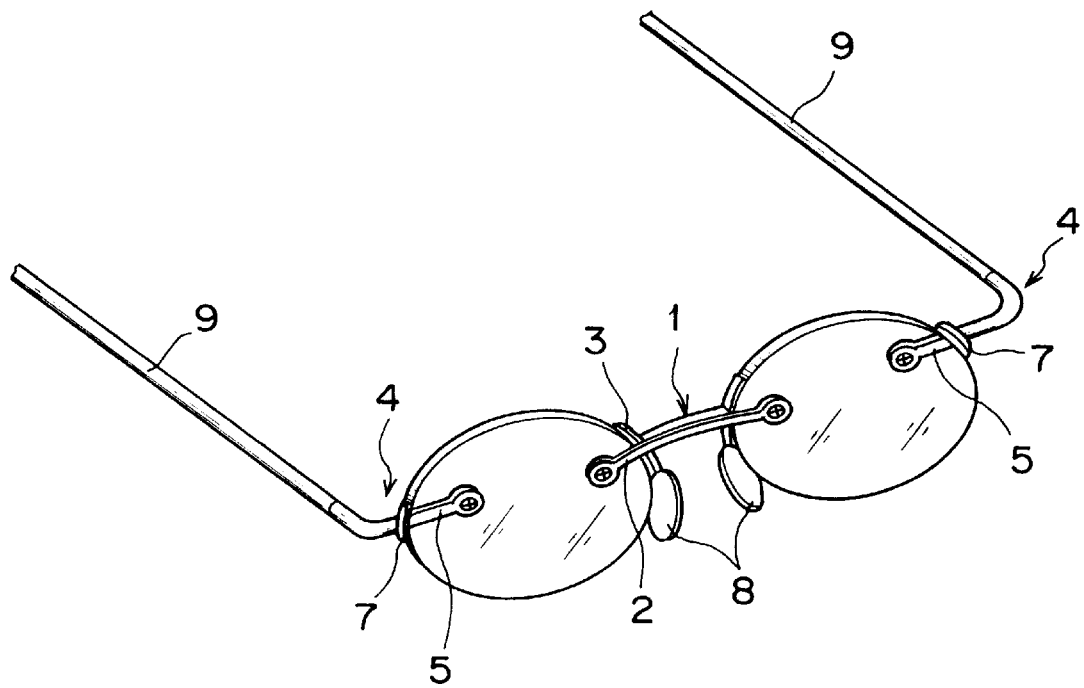
FIG. 1 is a schematic view showing the entire of fixtures and a fitting structure for eyeglass lens according to an embodiment of the present invention.

An embodiment of the present invention shown in the drawings will be described below.

Figure 2:
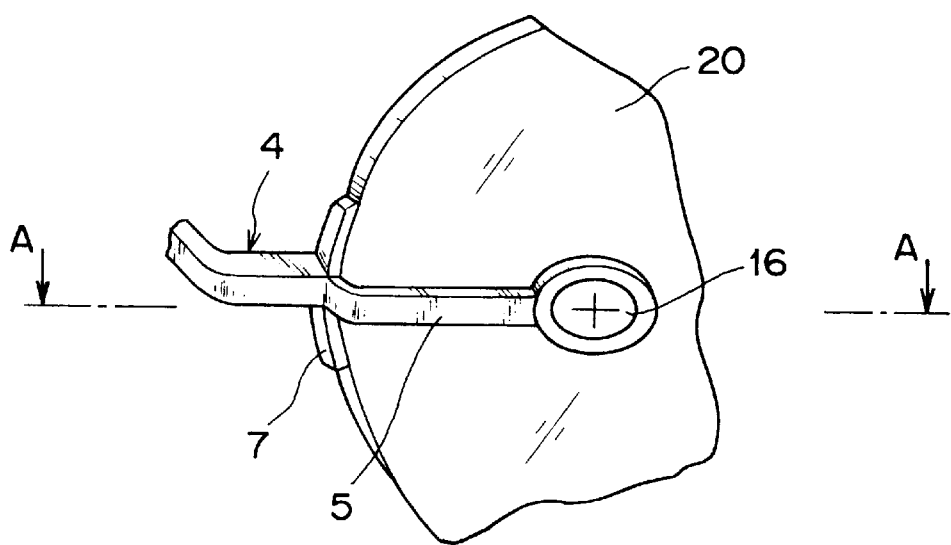
FIG. 2 is a partially enlarged view of fixtures and the fitting structure shown in FIG. 1.
Figure 3:
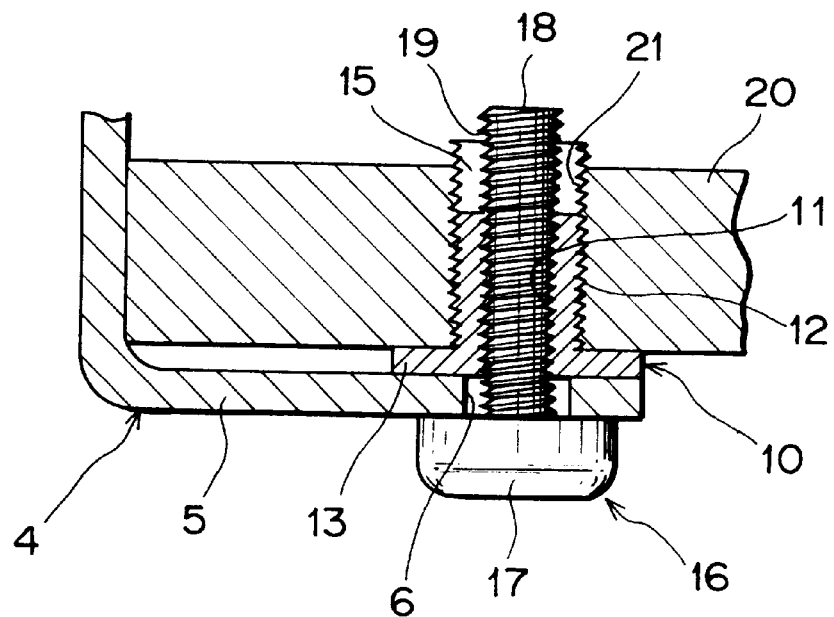
FIG. 3 is a sectional view of fixtures and the fitting structure at the line of A—A of FIG. 2.
Figure 4:
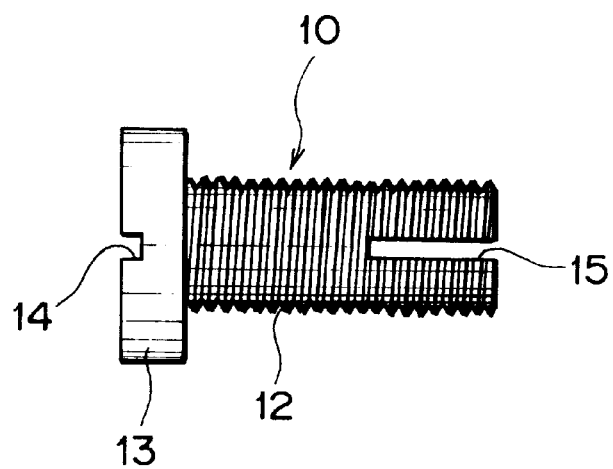
FIG. 4 is an enlarged front view of a pipe screw shown in FIG. 1.
Figure 5:
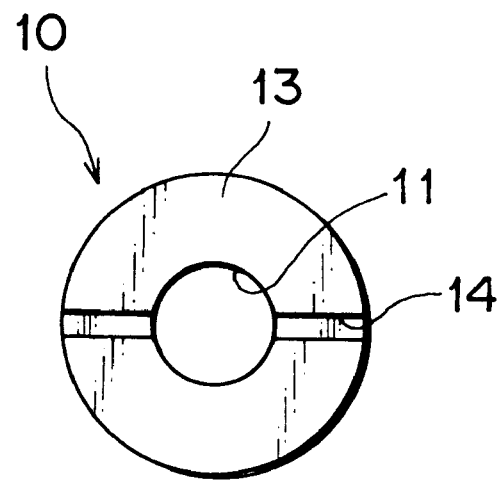
FIG. 5 is a left side view of the pipe screw shown in FIG. 4.
Figure 6:
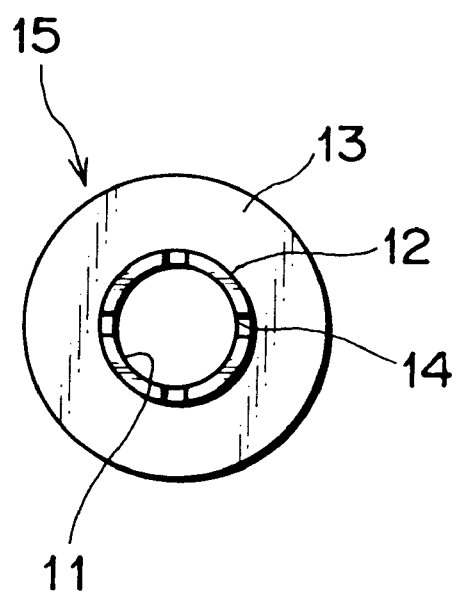
FIG. 6 is a right side view of the pipe screw shown in FIG. 4.

FIGS. 1 to 6 show fixtures and a fitting structure for eyeglass lens according to the embodiment of the present invention, which is effective for fitting eyeglass lens to a two-point type eyeglass frame, wherein eyeglass lens 20 are respectively attached between a bridge 1 and an end piece 4 of an eyeglass frame by combined functions of pipe screws 10 with setscrews 16.

The two-point type eyeglass frame comprises an I-shaped bridge 1, a nose pad 8 to be attached to the bridge 1, L-shaped end pieces 4, and rod-like temples 9 each swingablly attached to the end piece 4.

At both ends of the bridge 1, fitting portions 2 and 2 are respectively arranged; at the tip end of each fitting portion 2, a hole (not shown) for inserting a screw thereinto is formed in a penetrated state; further, at the base portion of each fitting portion 2, a circular-arc stopper 3 for preventing the rotation of an eyeglass lens 20 by abutting the peripheral face of the eyeglass lens 20 is unitarily disposed.

At one end of each end piece 4, a fitting portion 5 is formed; at the tip end of each fitting portion 5, a hole 6 for inserting a screw thereinto is formed in a penetrated state; further, at the base portion of each fitting portion 5, a circular-arc stopper 7 for preventing the rotation of the eyeglass lens 20 by abutting the peripheral face of the eyeglass lens 20 is unitarily disposed.

The other end of each end piece 4 is formed to have a fork shape; in one of the forked portions, a hole (not shown) for inserting a screw thereinto is formed in a penetrated state; in the other of the forked portions, a tapped hole (not shown) is formed in a penetrated state.

At one end of each temple 9, an engaging piece (not shown) engageable with the forked portions of the end piece 4 is unitarily formed; in the engaging piece, a hole (not shown) for inserting a screw thereinto is formed in a penetrated state.

The engaging piece at one end of each temple 9 is brought into engagement with the forked portions of the end piece 4; at this state, a screw (not shown) is inserted through both the segments and screwed thereinto, so that the temple 9 can be swingablly connected to the end piece 4.

A pipe screw 10 is a cylinder having internal and external peripheral surfaces on which screw portions 11 and 12 threaded over the entire periphery are respectively formed. At one end of the pipe screw 10, an annular flange 13 radially extending outwardly is unitarily formed; on the surface of the flange 13, an I-shaped groove 14 for engaging with a screwdriver is formed; at the other end thereof, four slits 15 are crosswise formed and penetrate between the external and internal peripheral surfaces from the tip end of the pipe screw 10 to a predetermined position thereof. In addition, the number of the slits 15 is not limited to four; however, it may be less than four or it may be five or more. The internal diameter of the pipe screw 10 is made to have a tight fit to a setscrew 16 so that the other end of the pipe screw 10, in which the slits 15 are located, is outwardly expanded when the setscrew is screwed into the internal peripheral side of the pipe screw.

The setscrew 16 is formed of a head 17 and a leg 18 unitarily formed with the head 17 at the center thereof; in the entire leg 18 formed is a screw portion 19 capable of screwing into the screw portion 11 of the internal peripheral surface of the pipe screw 10.

In order to attach the eyeglass lens 20 to the two-point type eyeglass frame formed as above: first, at predetermined positions of the inside and outside rims of the eyeglass lens 20, tapped holes 21 are respectively formed in a penetrated state by using tools such as a drill and a tap; the two of such eyeglass lens 20 and 20 are prepared.

Then, the pipe screw 10 is screwed into the tapped hole 21 of each eyeglass lens 20; the pipe screw 10 is tightened so that the flange 13 is abutted on the face of the eyeglass lens 20 by engaging the tip of a screwdriver with the groove 14 on the face of the flange 13 and rotating the screwdriver.

Then, the two of the eyeglass lens 20 and 20 are arranged to have a predetermined spacing therebetween; the bridge 1 is arranged between the internal rims of both the eyeglass lenses 20 and 20; fitting portions 2 and 2 at both ends of the bridge 1 are located over top faces of the eyeglass lenses 20 and 20; the hole in each fitting portion 2 is aligned with the tapped hole 21 at the inside rim of each eyeglass lens 20.

The setscrew 16 is inserted into the hole in each fitting portion 2 of the bridge 1 from the top side of each eyeglass lens 20; each setscrew 16 is screwed into the screw portion 11 of the internal peripheral surface of the pipe screw 10 and tightened with a screwdriver; since the pipe screw 10 is made to have a tight fit to a setscrew 16, the pipe screw 10 is outwardly expanded to increase the diameter by tightening each setscrew 16, so that the screw portion 12 of the external peripheral surface of the pipe screw 10 is tightly pressed on the internal surface of the tapped hole 21 of the eyeglass lens 20.

The end pieces 4 are respectively located at the external rims of the eyeglass lenses 20 and 20; the fitting portion 5 of each end piece 4 is situated over the top surface of each eyeglass lens 20 so as to align the hole 6 in each fitting portion 5 with the tapped hole 21 at the external rim of each eyeglass lens 20.

The setscrew 16 is inserted into the hole 6 in each fitting portion 5 of each end piece 4 from the top side of each eyeglass lens 20; each setscrew 16 is screwed into the screw portion 11 of the internal peripheral surface of each pipe screw 10 and tightened with a screwdriver; in this case, since the pipe screw 10 is made to have a tight fit to the setscrew 16, the pipe screw 10 is outwardly expanded to increase the diameter by tightening each setscrew 16, so that the screw portion 12 of the external peripheral surface of the pipe screw 10 is tightly pressed on the internal surface of the tapped hole 21 of the eyeglass lens 20.

In such a manner, the two eyeglass lenses 20 and 20 can be respectively attached between the bridge 1 and the end piece 4 of the two-point type eyeglass frame.

In the fixtures and the fitting structure for eyeglass lens formed as above according to the embodiment, the eyeglass lens 20 is attached between the bridge 1 and the end piece 4 by the joint operation of the pipe screw 10 with the setscrew 16; since the flange 13 of the pipe screw 10 serves as well as a washer in this case, the number of parts can be reduced so that the part cost is not increased, and the assembling cost is thereby reduced.

When the setscrew 16 is screwed into the pipe screw 10 and tightened thereto, the pipe screw 10 is outwardly expanded to increase the diameter, so that the screw portion 12 of the external peripheral surface of the pipe screw 10 is tightly pressed on the internal surface of the tapped hole 21 of the eyeglass lens 20. Thereby, the loosening of the pipe screw 10, the setscrew 16, and further the eyeglass lens 20 during being used can be prevented.

Further, even when the setscrew 16 is screwed into the pipe screw 10 and tightened thereto, the load is mainly applied in a direction expanding the tapped hole 21 of the eyeglass lens 20 and the excessive load in the thickness direction of the eyeglass lens 20 is not applied, so that the eyeglass lens 20 cannot be cracked from the tapped hole 21; thereby special attention is not required for the assembling and even inexperienced workers can easily assemble the eyeglass lens.

Moreover, since the pipe screw 10 and the setscrew 16 can be easily tightened with a screwdriver, any special tool is not needed and even inexperienced workers can assemble the eyeglass lens 20 without damaging the eyeglass lens 20.

As the nut and the cap nut are not used on the backside of the eyeglass lens 20, the field of vision is not prevented and there are no obstacles when wiping the surface.

In addition, when unevenness such as knurling is formed on the external peripheral face of the pipe screw 10 instead of the screw portion on the external peripheral face of the pipe screw 10 to be screwed into the tapped hole 21 of each eyeglass lens 20, the pipe screw 10 is firmly pressed onto the internal peripheral face of the tapped hole 21 of the eyeglass lens 20 during screwing of the setscrew 16 due to the unevenness of the external peripheral face.

Furthermore, although not shown, the flange 13 of the pipe screw 10 may be formed in a hexagonal shape. In this case, the pipe screw 10 can be tightened with a box wrench without using a screwdriver.

What is claimed is:

1. Fixtures for fitting an eyeglass lens between a bridge and an end piece of an eyeglass frame, the fixtures comprising:

a pipe screw inserted into a tapped hole formed in at least one of locations of the inside and outside rims of the eyeglass lens and having a thread at least on the internal peripheral face of internal and external faces thereof; and a setscrew for expanding the diameter of the pipe screw by inserting the setscrew into a hole of each of fitting portions of the bridge and the end piece and by screwing and tightening the setscrew into the internal peripheral side of each pipe screw in an aligned state of at least one of combinations of the pipe screw in the inside rim with the hole in the fitting portion of the bridge and of the pipe screw in the outside rim with the hole in the fitting portion of the end piece.

2. Fixtures according to claim 1, wherein the pipe screw comprises a flange formed at one end of the pipe screw, so that the flange is abutted on the surface of the eyeglass lens when the pipe screw is screwed into the tapped hole of the eyeglass lens.

3. Fixtures according to any one of claims 1 and 2, wherein at least one slit is formed at the other end of the pipe screw, the slit penetrating between the external and internal peripheral faces of the pipe screw so as to expand the pipe screw so that the diameter of the pipe screw is increased due to the slit when the setscrew is screwed into the internal peripheral side of the pipe screw.

4. A structure for fitting an eyeglass lens between a bridge and an end piece of an eyeglass frame prepared by a process comprising the steps of:

forming a tapped hole in at least one of locations of the inside and outside rims of the eyeglass lens;

inserting a pipe screw into the tapped hole, the pipe screw having a thread at least on the internal peripheral face of internal and external faces thereof;

aligning at least one of combinations of the pipe screw in the inside rim with a hole in a fitting portion of the bridge and of the pipe screw in the outside rim with a hole in a fitting portion of the end piece;

inserting a setscrew into the hole of each fitting portion; and screwing and tightening each setscrew into the internal peripheral side of each pipe screw so as to expand the pipe screw so that the diameter of the pipe screw is increased.

5. A structure according to claim 4, wherein the process further comprises the steps of:

forming a flange at one end of the pipe screw; and abutting the flange on the surface of the eyeglass lens when the pipe screw is screwed into the tapped hole of the eyeglass lens.

6. A structure according to any one of claims 4 and 5, wherein the process further comprises the step of forming at least one slit at the other end of the pipe screw, the slit penetrating between the external and internal peripheral faces of the pipe screw so as to expand the pipe screw so that the diameter of the pipe screw is increased due to the slit when the setscrew is screwed into the internal peripheral side of the pipe screw.

* * * * *